United States Patent [19]

Baann

[11] Patent Number: 5,973,070
[45] Date of Patent: Oct. 26, 1999

[54] POLYOLEFIN ALLOY WITH IMPROVED SURFACE HARDNESS AND SCRATCH RESISTANCE

[75] Inventor: Henning Baann, Skjelsvik, Norway

[73] Assignee: Borealis A/S, Lyngby, Denmark

[21] Appl. No.: 08/860,977

[22] PCT Filed: Jan. 9, 1996

[86] PCT No.: PCT/NO96/00003

§ 371 Date: Sep. 18, 1997

§ 102(e) Date: Sep. 18, 1997

[87] PCT Pub. No.: WO96/22328

PCT Pub. Date: Jul. 25, 1996

[30] Foreign Application Priority Data

Jan. 16, 1995 [NO] Norway ................................. 950160

[51] Int. Cl.$^6$ ............................ C08L 23/10; C08L 51/06; C08L 53/00; C08K 13/02

[52] U.S. Cl. ............................... 525/70; 525/86; 525/87; 524/186; 524/188; 524/232; 524/261; 524/442; 524/445; 524/447; 524/451

[58] Field of Search ............................. 525/70, 86, 87; 524/186, 188, 232, 261, 442, 445, 447, 451

[56] References Cited

U.S. PATENT DOCUMENTS

| | | | |
|---|---|---|---|
| 4,433,073 | 2/1984 | Sano et al. | 523/201 |
| 4,675,122 | 6/1987 | Luers et al. | |
| 4,751,262 | 6/1988 | McKinney et al. | |
| 4,808,484 | 2/1989 | Yamada et al. | |
| 5,286,791 | 2/1994 | DeNicola, Jr. et al. | |
| 5,486,561 | 1/1996 | Hirano et al. | |

FOREIGN PATENT DOCUMENTS

| | | |
|---|---|---|
| 0 265 075 | 4/1988 | European Pat. Off. |
| 0 508 415 | 10/1992 | European Pat. Off. |
| WO93/03095 | 2/1993 | WIPO |
| WO93/21269 | 10/1993 | WIPO |
| WO94/18267 | 8/1994 | WIPO |

OTHER PUBLICATIONS

Derwent English–language abstract of Japanese Patent publication 1,318,051 "Plastics Additives Handbook", 3rd Edition, pp. 542–545 (1991).

*Primary Examiner*—Nathan M. Nutter
*Attorney, Agent, or Firm*—Scully, Scott, Murphy & Presser

[57] ABSTRACT

A polyolefin alloy and a process for making the same which alloy includes (A) 40% to 80% by weight of polypropylene material which may be a polypropylene homopolymer or a propylene copolymer with ethylene and/or butadiene, the polypropylene copolymer including 5 mole % to 35 mole % polymerized ethylene and/or butadiene, the polypropylene material having a molecular weight Mw of 100,000 to 300,000 and a melt index of 0.1 to 20 g/10 min; (B) 1% to 10% by weight of a functionalized polypropylene, which may be a grafted polypropylene homopolymer or a grafted copolymer of propylene with ethylene and/or butadiene, having a degree of grafting of 0.2% to 10% by weight; (C) 1% to 50% by weight of a mineral having a mean particle size of about 2.5 μm and a maximum particle size of about 20 μm, the mineral being surface-treated with 0.2% to 5% by weight of amino silane; (D) 1% to 15% by weight of an amorphous fatty acid-treated silica gel including 25% to 75% by weight silica and 25% to 75% fatty acid amide; and (E) 0 to 40% by weight of an ethylene/propylene/polyene terpolymer having a melt index in the range of 1 to 10 g/10 min and a Shore D hardness of 30 to 70. The process of making the alloy includes blending the above components, melting and kneading the blend and cooling and granulating the blend. The alloy is characterized by improved surface hardness and scratch resistance.

16 Claims, 2 Drawing Sheets

POLYOLEFIN ALLOY WITH IMPROVED SURFACE HARDNESS AND SCRATCH RESISTANCE

This application ia filed under 371 of PCT/NO 96/00003, filed Jan. 9, 1996 and claims priority from Norway patent application 950160 filed Jan. 16, 1995.

BACKGROUND OF THE DISCLOSURE

The present invention relates to a polyolefin alloy with improved surface hardness and scratch resistance, and processes for producing same. More specifically, the invention relates to a polyolefin alloy on the basis of a polypropylene material, a functionalized polypropylene material, a mineral, an amorphous silica gel and optionally an ethylene/propylene/polyene terpolymer (EPDM), as well as processes for producing said polyolefin alloy.

Various techniques for increasing the scratch resistance of polyolefin materials are previously known, i.a. addition of silica materials. Thus, JP 1318051 (Toray Silicone KK) discloses polyolefins which for this purpose have been modified with a filler on silica basis. Said filler may have been surface treated with silane type compounds. However, the disclosed polyolefins are not alloys and no fatty acid amide-treated silica gel is used in the material. JP 1104637 (Showa Denko KK) discloses materials on a polypropylene basis to which silica/alumina spheroids and a polypropylene material functionalized with carboxylic acid or carboxylic anhydride have been added. These materials also contains no fatty acid amide-treated silica gel.

It has now been found that when a functionalized polypropylene material and an amorphous, fatty acid amide-modified silica gel are incorporated into certain polyolefin materials having a mineral content, the scratch resistance of the material is substantially improved, with retention of the impact strength and the thermal shape stability (HDTA) of the material.

Thus, the invention provides a new polyolefin alloy having improved surface hardness and scratch resistance, and having a melt index MI in the range of 0.1–50 g/10 min at 230° C./2.16 kg, particularly in the range of 3 to 40 g/10 min at 230° C./2.16 kg. The polyolefin alloy is characterized in that it is constituted by a blend of:

(A) 40 to 80% by weight of a polypropylene material consisting of a polypropylene homopolymer or a copolymer of propylene with ethylene and/or butadiene, which polypropylene material may have a content of polymerized ethylene and/or butadiene units of 5 to 35 mole % and has a molecular weight Mw of 100,000 to 300,000 and a melt index MI of 0.1 to 20 g/10 min at 230° C./2.16 kg, (B) 1 to 10% by weight of a functionalized polypropylene material consisting of a grafted polypropylene homopolymer or copolymer of propylene with ethylene and/or butadiene, having a degree of grafting of 0.2 to 10% by weight, (C) 1 to 50% by weight of a mineral, having a mean particle size of about 2.5 $\mu$m and a maximum particle size of about 20 $\mu$m, and being surface-treated with 0.2 to 5% by weight of aminosilane, (D) 1 to 15% by weight of amorphous fatty acid-treated silica gel, comprising 25 to 75% by weight of silica and 75 to 25% by weight of fatty acid amide, (E) 0 to 40% by weight of an ethylene/propylene/polyene terpolymer (EPDM) having a melt index MI in the range of 1 to 10 g/10 min at 230° C./2.16 kg and a Shore D hardness of 30 to 70.

EP-A-0 567 058 (Hirano et al.) discloses compositions having improved elasticity, peeling strength and recoating properties, comprising a polypropylene, an ethylene/$\alpha$-olefin copolymer elastomer, and a modified polyolefin having a functional group in either or both ends thereof, as well as certain substituted amines/amides. In addition thereto, the compositions can also contain various additives, among which talc is mentioned. Said compositions of EP-A-0 567 058 do not, however, contain the combination of a functionalized polypropylene material of the same kind as component (B) of the polyolefin alloy of the present invention, with a mineral having been surface-treated with an aminosilane, and a fatty acid-treated silica gel, and they do not suggest any improvement of the scratch resistance.

U.S. Pat No. 4,675,122 (Lüers et al.) teaches a combined antiblocking agent and lubricant concentrate based on polyolefin, which contains diatomaceous earth, precipitated silica and/or silica gel as the antiblocking agent, and one more more amides of unsaturated $C_{18}$–$C_{22}$ fatty acids. No mention is made of any improvement of the scratch-resistance. Also, it could not be considered to be near at hand to combine the teaching of U.S. Pat No. 4,675,122 with the teaching of the above-discussed EP-A-0 567 058, which also does not mention scratch-resistance.

EP-A-0 297 693 (McKinney et al.) teaches a composition comprising an intimate mixture of at least one ethylene interpolymer with acrylic acid, methacrylic acid or an ionomer of either of said acids and a slip-enhancing amount of a secondary fatty acid amide. The composition may also contain small amounts of finely divided inorganic materials such as silica and talc. The aim of the invention of EP-A-0 297 693 is to improve the slip and/or block characteristics of the ethylene interpolymers. No mention is made of any improvement of the scratch-resistance. Even though said EP-A-0 297 693 is disclosing compositions in which silica may be used, and will come into contact with fatty acid amide, it is not question there of any fatty acid-treated silica gel comprising 25–75% by weight of silica and 75–25% by weight of fatty acid amide as in the polyolefin alloy of the present invention. To the extent a finely inorganic material is used in the composition of EP-A-0 297 693, no surface treatment thereof with aminosilane is mentioned, neither is there any mention of any functionalized polypropylene material. A similar composition is disclosed in EP-A-0 257 803 (Yamada et al.), comprising an ethylene/methyl methacrylate copolymer, a slip agent which may be a fatty acid amide, and a small amount (0.01–0.1 % wt) of an inorganic filler, which may be a silica or a talc. The composition is used to produce peelable protective films with low peeling strength for wrapping around e.g. rubbery articles having a tacky surface. Neither EP-A-0 257 803 nor EP-A-0 297 693 suggests the polyolefin alloy of the present invention having improved surface hardness and scratch-resistance.

U.S. Pat. No. 5,286,791 (De Nicola et al.) discloses a filled composition having improved flexural modulus and impact strength, comprising a propylene polymer material, a propylene polymer material grafted with one or more vinyl monomers, and a rubber component. As filler, the composition may contain i.a. talc and silica, and column 3, lines 25–37, of the patent indicates that the filler may be coated with an organic compound. However, the patent does not suggest any fatty acid amide-treated silica gel in combination with an aminosilane-treated mineral and there is no suggestion in said patent that any such combination would improve the surface hardness and scratch-resistance of a polyolefin alloy as defined according to the present invention.

SUMMARY OF THE INVENTION

BRIEF DESCRIPTION OF THE DRAWINGS

The invention may be better understood by reference to the accompanying drawings of which.

Figure 1:
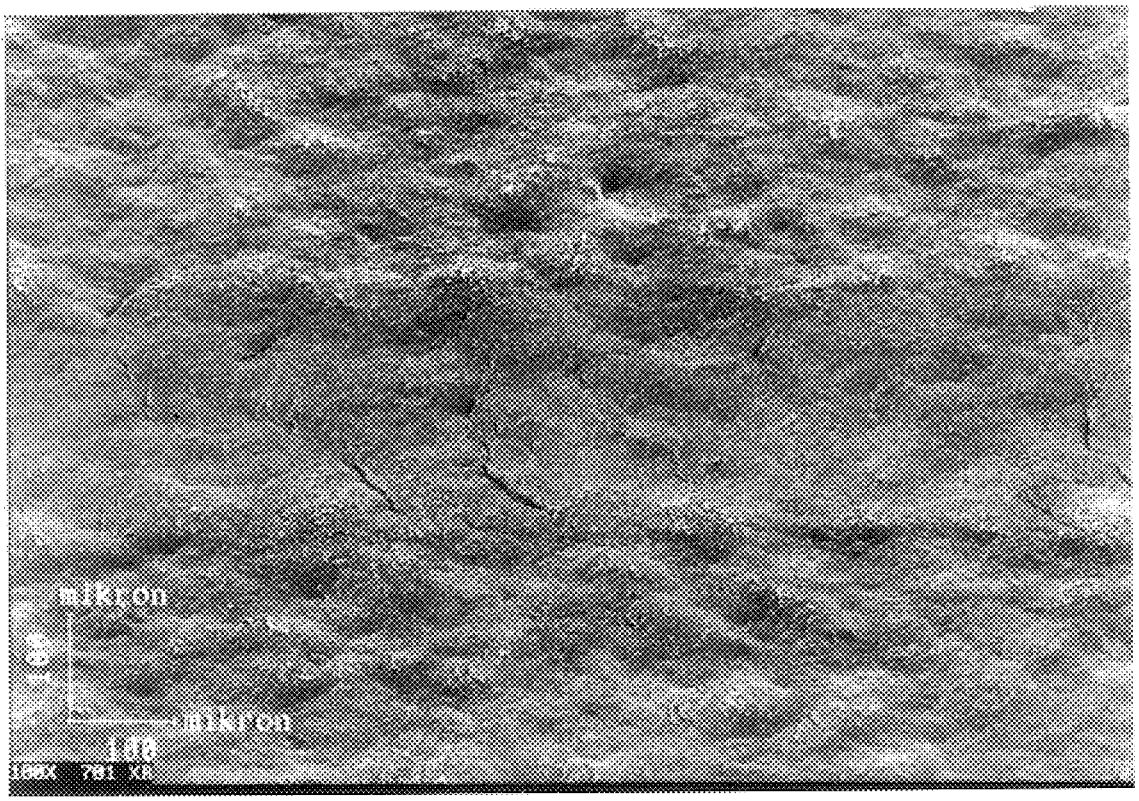
FIG. 1 is a photograph of a first polyolefin alloy in accordance with the present invention.

The new polyolefin alloy of the present invention can be produced by blending the components (A), (B), (C) and (D), and optionally utilized component (E); melting and preferably kneading the blend; and then cooling and granulating the obtained blend.

Alternatively, the new polyolefin alloy can be produced by blending the components (A) and (B) and optionally utilized component (E); melting the blend; blending the components (C) and (D) into the melt, preferably with kneading of the blend; and then cooling and granulating the obtained blend.

The production of the polyolefin alloy can be effected in a mixer of any suitable type, for instance a continuous or batchwise mixer, although it is preferred to use an extruder.

Particularly suitable polypropylene materials (A) for use in the new polyolefin alloy are copolymers of propylene and ethylene. A particularly suitable polypropylene material is a copolymer of propylene and ethylene having a content of 5 to 25% by weight of polymerized ethylene units.

Suitable functionalized polypropylene materials (B) for use in the new polyolefin alloy are polypropylene homopolymers and copolymers of propylene and ethylene and/or butadiene (B), grafted with a compound selected from maleic anhydride, acrylic acid, acrylates and methacrylates, vinyl silanes and other vinyl compounds. Particularly good results are obtained by grafting maleic anhydride on the polypropylene material.

The functionalized polypropylene material can have a melt index MI in the range of 5 to 250 g/10 min at 230° C./2.16 kg, more preferably in the range of 10 to 150 g/10 min at 230° C./2.16 kg.

Suitable minerals (C) for use in the polyolefin alloy of the invention are finely divided minerals which have been silanized with one or more of the aminosilanes traditionally used for surface treatment of talc. Particularly suitable minerals for use in the alloy after such silanizing treatment are wollastonite, kaolin, mica, calcium carbonate and talc, particularly talc. Preferably, the treated mineral has a mean particle size $D_{50}$ in the range of 0.5 to 10 $\mu$m, more preferably 1–6 $\mu$m.

The silica gel material (D) which is used in the polyolefin alloy of the invention is preferably a fatty amide-treated, amorphous, synthetic silica gel containing 40 to 65% by weight of silica and 60 to 35% by weight of fatty acid amide.

Ethylene/propylene/polyene terpolymers (EPDM) that are particularly useful as an optional component in the polymer alloy of the invention are such terpolymers which have an ethylene content of 30 to 90% by weight and a flow, determined according to the Mooney method (ML 101° C.), of 0 to 60, more preferably 0 to 50.

Although the invention is not meant to be limited by any particular theory regarding the mechanism behind the improved surface hardness and scratch resistance achieved with the new polyolefin alloy, chemical reaction seems to take place between the functionalized polypropylene material (B) and the surface-treated mineral (C), and between the functionalized polypropylene material (B) and the amorphous, fatty acid amide-treated silica gel (D).

The following examples illustrate the preparation of the new polyolefin alloys of the invention. The following properties of the prepared alloys were measured:

Modulus of elasticity: Measured at 23° C. according to ISO 527 (MPa).

Notched Izod: Measured at −40° C. according to ISO VSI 180/1A (kJ/m$^2$).

Thermal shape stability (HDTA): Measured according to ISO 75 (°C.).

Shrinkage: Calculated directly (in %) from measurements of length and width of a stamped square of a sheet of thickness 2 mm, moulded under given injection moulding conditions. The test sheets for each pair of Example illustrating the invention and Comparison Example were moulded under the same moulding conditions.

Scratch resistance: Measured with an Ericsson pen according to ISO 1518.

EXAMPLE 1

An alloy on polypropylene basis was prepared from the following components:

A. A copolymer of propylene and ethylene containing 14% by weight of polymerized ethylene and having a melt index MI of 8.0 g/10 min at 230° C./2.16 kg.

B. A polypropylene functionalized with maleic anhydride (MAH), containing 0.7% by weight of MAH and having a melt index MI of 200 g/10 min at 230° C./2.16 kg.

C. A talc the surface of which has been treated with 1.5 to 2.0% by weight of aminosilane, said talc having a density of 330 kg/m$^3$ and a particle size $D_{50}$ of 2 to 5 $\mu$m.

D. An amorphous, synthetic, fatty acid amide-treated silica gel, containing 40 to 50% by weight of fatty acid amide (essentially 13-docoseneamide), having a density of 300 kg/m$^3$ and a particle size $D_{50}$ of 2 to 4 $\mu$m.

E. A low crystallinity ethylene/propylene/polyene terpolymer (EPDM) containing 47% of polymerized ethylene and having a density of 870 kg/m$^3$ and melt index MI of 0.6 g/10 min at 230° C./2.16 kg.

The alloy was prepared in a "Werner & Pfleiderer" double screw extruder, type ZSK, having 57 mm co-rotating screws. Before and after the preparation, the hopper was flushed with nitrogen gas in order that the preparation should take place in an approximately inert atmosphere. The screw speed was 200 rpm and the rate of extrusion was 80 kg/h. All the raw material was introduced gravimetrically at feed point 1. The temperature profile of the extruder was maintained in the range of 210to 230° C. The components added, the amounts thereof (in % by weight of the total blend) and the results are given in the table below. FIG. 1 shows the appearance of a test sample of the alloy after the scratch resistance having been measured with an Ericsson pen according to ISO 1518.

EXAMPLE 2 (Comparison example)

Figure 2:
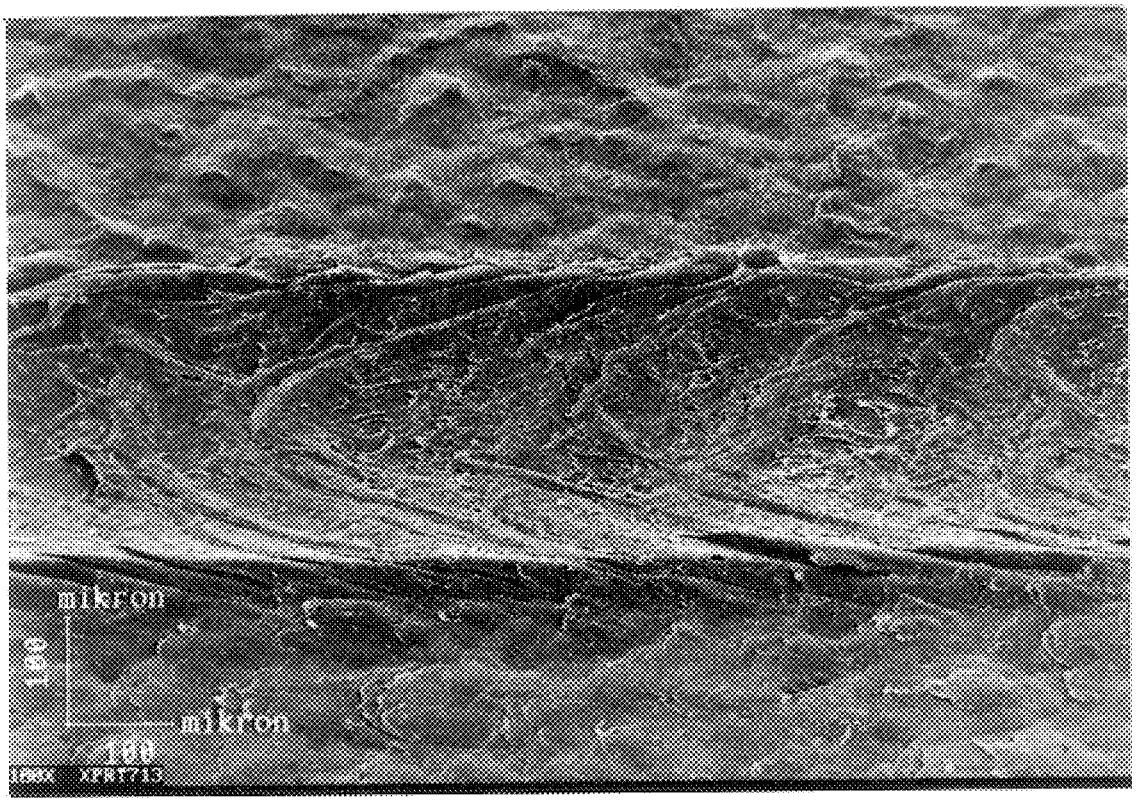
FIG. 2 is a photograph of a polyolefin alloy outside the scope of the present invention.

The procedure of Example 1 was followed, with the exception that the fatty acid amide-treated silica gel (component D) was omitted. The added components, the amounts thereof (in % by weight of the total blend) and the results are given in the table below. FIG. 2 shows the appearance of a test sample of the alloy after the scratch resistance having been measured with an Ericsson pen according to ISO 1518.

EXAMPLE 3

Figure 3:
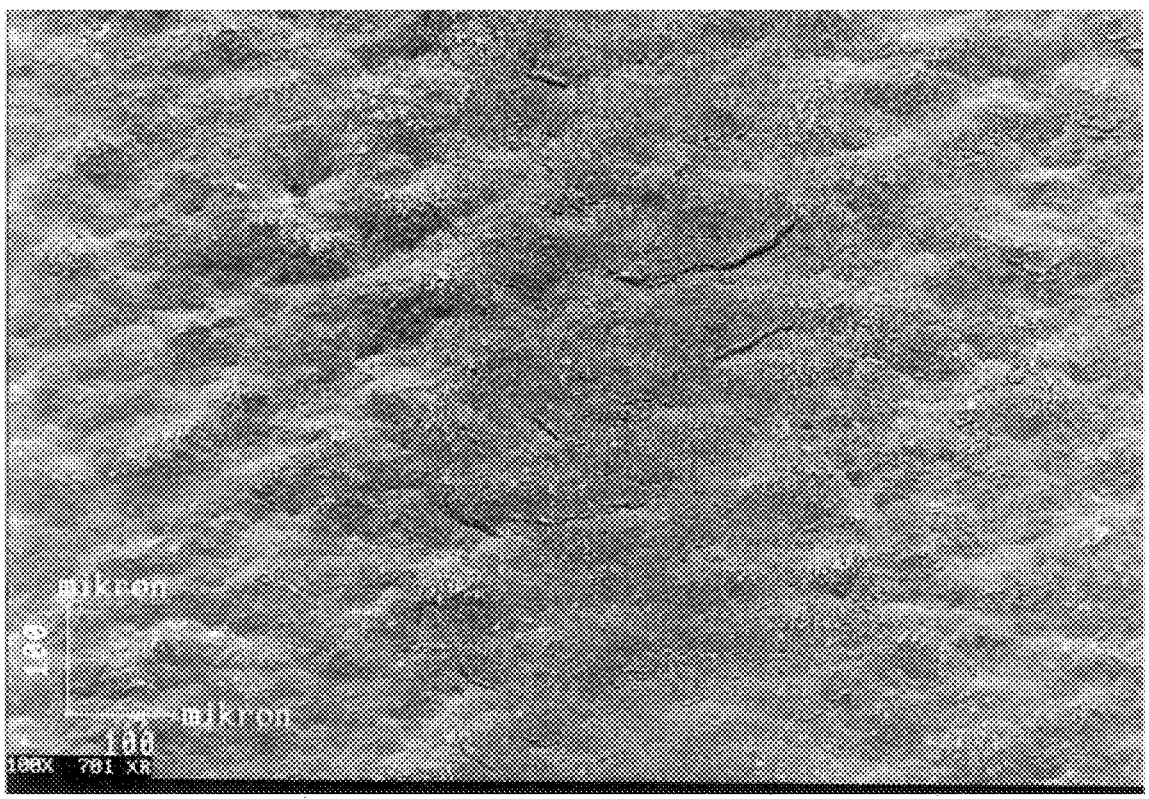
FIG. 3 is a photograph of a second polyolefin alloy in accordance with the present invention.

It was proceeded as in Example 1, with the exception that the amount of talc (component C) was increased from 10% by weight to 30% by weight. The added components, and the amounts thereof (in % by weight of the total blend) and the results are given in the table below. FIG. 3 shows the appearance of a test sample of the alloy after the scratch resistance having been measured with an Ericsson pen according to ISO 1518.

EXAMPLE 4 (Comparison example)

Figure 4:
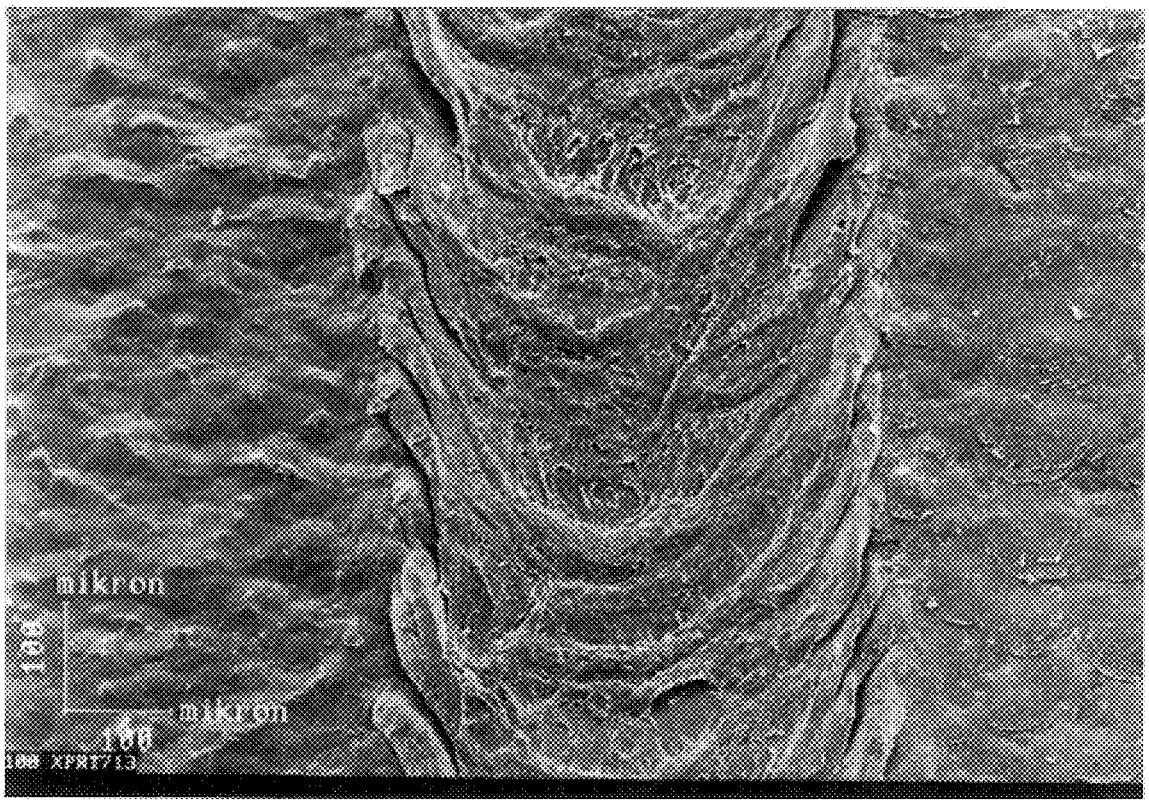
FIG. 4 is a photograph of a second polyolefin alloy outside the scope of the present invention.

It was proceeded as in Example 2, with the exception that the amount of talc (component C) was increased from 10% by weight to 30% by weight. The added components, and the amounts thereof (in % by weight of the total blend) and the results are given in the table below. FIG. 4 shows the appearance of a test sample of the alloy after the scratch resistance having been measured with an Ericsson pen according to ISO 1518.

resistance increasing from 1 to 5. The improvement is also clearly seen by comparing FIG. 3, which shows the surface of the new alloy of Example 3 after the scratch resistance having been measured, with FIG. 4, which is a similar picture of the alloy of Example 4. It also appears from the table that the E modulus and the shrinkage are improved for the alloy of Example 3, while the notched bar impact (Izod) at −40° C. and the thermal shape stability (HDTA) are retained unaltered or are somewhat reduced.

I claim:

1. A polyolefin alloy having improved surface hardness and scratch resistance, and having a melt index in the range of 0.1 to 50 g/10 min comprising a blend of:
    (A) 40% to 80% by weight of a polypropylene material selected from the group consisting of a polypropylene homopolymer and a copolymer of propylene with ethylene and/or butadiene, said propylene copolymer having a content of polymerized ethylene and/or butadiene units of 5 mole % to 35 mole %, said polyproplene material having a molecular weight Mw of 100,000 to 300,000 and a melt index of 0.1 to 20 g/10 min;
    (B) 1% to 10% by weight of a functionalized polypropylene selected from the group consisting of a grafted polypropylene homopolymer and a grafted copolymer

TABLE

Preparation of alloys on polypropylene basis, having improved scratch resistance.

| Ex. | pp[1] (% wt) | PP-g-MAH[2] (% wt) | Talc[3] (% wt) | Silica gel[4] (% wt) | EPDM (% wt) | E-modulus (MPa) | Izod −40° C. (J/m) | HDTA (° C.) | Shrinkage (%) | Scratch resist. (7.5 N) |
|---|---|---|---|---|---|---|---|---|---|---|
| 1 | 70 | 5 | 10 | 5 | 10 | 1450 | 60 | 52 | 1.3 | 3 |
| 2 (Comp.) | 80 | — | 10 | — | 10 | 1600 | 50 | 54 | 1.3 | 0.5 |
| 3 | 50 | 5 | 30 | 5 | 10 | 2100 | 50 | 64 | 1.0 | 5 |
| 4 (Comp.) | 60 | — | 30 | — | 10 | 2400 | 35 | 68 | 0.7 | 1 |

[1] A copolymer of propylene and ethylene with 14% by weight of polymerized ethylene and a MI 8.0 g/10 min at 230° C./2.16 kg.
[2] A polypropylene functionalized with MAH, having a MAH content of 0.7% by weight and a MI of 200 g/10 min at 230° C./2.16 kg.
[3] A talc surface-treated with 1.5–2.0% by weight of aminosilane, having a density of 330 kg/m$^3$ and a particle size D$_{50}$ på 2–5 μm.
[4] An amorphous, synthetic, fatty acid amide-treated silica, containing 40–50% by weight of fatty acid amide, and having a density of 300 kg/m$^3$ and a particle size D$_{50}$ of 2–4 μm.
[5] A low crystallinity ethylene/propylene/polyene terpolymer (EPDM) containing 47% of polymerized ethylene, having a density of 870 kg/m$^3$ and a melt index MI of 0.6 g/10 min at 230° C./2.16 kg.

It can be seen from the results given in the above table, by comparing Example 1 illustrating the invention and Comparison Example 2 illustrating the prior art, the addition of 5% by weight of fatty acid amide-treated silica gel substantially improves the scratch resistance of the alloy, which increases from 0.5 to 3. This improvement is also clearly seen by comparing FIG. 1, which shows the surface of a test sample of the alloy of Example 1 after the scratch resistance having been measured, with FIG. 2, which is a similar picture of a test sample of the alloy of Example 2. The table further shows that essential properties such as stiffness (E modulus) and shrinkage are improved with the new technology, while the notched bar impact (Izod) at −40° C. and the thermal shape stability (HDTA) are retained unaltered or are somewhat reduced.

A similar comparison between the results obtained for the alloys of Example 3 and Example 4 (comparison example), in which examples 30% by weight of talc was used (vs. 10% by weight in Examples 1 and 2), shows that a substantial increase in the scratch resistance is achieved by adding 5% by weight of fatty acid amide-treated silica gel, said scratch of propylene with ethylene and/or butadiene, having a degree of grafting of 0.2% to 10% by weight;
    (C) 1% to 50% by weight of a mineral having a mean particle size of about 2.5 μm and a maximum particle size of about 20 μm, said mineral being surface-treated with 0.2% to 5% by weight of amino silane;
    (D) 1% to 15% by weight of an amorphous fatty acid-treated silica gel, said silica gel comprising 25% to 75% by weight of silica and 25% to 75% by weight of a fatty acid amide; and
    (E) 0 to 40% by weight of an ethylene/propylene/polyene terpolymer having a melt index in the range of 1 to 10 g/10 min and a Shore D hardness of 30 to 70.

2. A polyolefin alloy according to claim 1 wherein said functionalized polypropylene homopolymer or copolymer of propylene with ethylene and/or butadiene (B) is grafted with a compound selected from the group consisting of maleic anhydride, acrylic acid, acrylates, methacrylates, vinyl silanes and other vinyl compounds.

3. A polyolefin alloy according to claim 1 wherein said polypropylene material (A) is a copolymer of propylene and ethylene and has a content of 5% to 25% by weight of polymerized ethylene units.

4. A polyolefin alloy according to claim 3 wherein said functionalized polypropylene (B) has a degree of grafting of 0.5% to 2% by weight.

5. A polyolefin alloy according to claim 1 wherein said mineral (C) is surface-treated with about 1% by weight of amino silane.

6. A polyolefin alloy according to claim 1 wherein said mineral (C) is selected from the group consisting of wollastonite, kaolin, mica, calcium carbonate and talc.

7. A polyolefin alloy according to claim 6 wherein said mineral (C) is talc.

8. A polyolefin alloy according to claim 2 wherein said compound with which said functionalized polypropylene is grafted is maleic anhydride.

9. A polyolefin alloy having improved surface hardness and scratch resistance, and having a melt index in the range of 0.3 to 40 g/10 min, comprising a blend of:
  (A) 60% to 80% by weight of a polypropylene material selected from the group consisting of a polypropylene homopolymer and a propylene copolymer with ethylene and/or butadiene, said propylene copolymer having 5 mole % to 35 mole % polymerized ethylene and/or butadiene units, said polypropylene material having a molecular weight Mw of 100,000 to 300,000 and a melt index of 0.1 to 20 g/10 min;
  (B) 2.5% to 7.5% by weight of a functionalized polypropylene selected from the group consisting of a grafted polypropylene homopolymer and a grafted propylene copolymer with ethylene and/or butadiene, said grafted propylene homopolymer or copolymer having a degree of grafting of 0.2% to 10% by weight;
  (C) 7.5% to 35% by weight of a mineral, said mineral having a mean particle size of about 2.5 $\mu$m and a maximum particle size of about 20 $\mu$m, said mineral surface-treated with 0.2% to 5% by weight of amino silane;
  (D) 2.5% to 7.5% by weight of an amorphous fatty acid-treated silica gel comprising 25% to 75% by weight of silica and 25% to 75% by weight of a fatty acid amide; and
  (E) 0 to 25% by weight of an ethylene/propylene/polyene terpolymer having a melt index in the range of 1 to 10 g/10 min and a Shore D hardness of 30 to 70.

10. A polyolefin or alloy according to claim 9 wherein said component (A) is a copolymer of propylene and ethylene which includes 5% to 25% by weight of polymerized ethylene.

11. A polyolefin alloy according to claim 9 wherein said functionalized polypropylene (B) is grafted with maleic anhydride.

12. A polyolefin alloy according to claim 11 wherein said functionalized polypropylene material (B) has a degree of grafting of 0.5% to 2% by weight.

13. A polyolefin alloy according to claim 9 wherein said mineral (C) is talc.

14. A process of producing a polyolefin alloy having improved surface hardness and scratch resistance, and having a melt index in the range of 0.1 to 50 g/10 min, comprising the steps of
  (a) blending (A) 40% to 80% by weight of a polypropylene material selected from the group consisting of a polypropylene homopolymer and a propylene copolymer with ethylene and/or butadiene, said propylene copolymer having a polymerized ethylene and/or butadiene content of 5% mole % to 35 mole %, said polypropylene material (A) having a molecular weight Mw of 100,000 to 300,000 and a melt index of 0.1 to 20 g/10 min; (B) 1% to 10% by weight of a functionalized polypropylene selected from the group consisting of a grafted polypropylene homopolymer and a grafted propylene copolymer with ethylene and/or butadiene having a degree of grafting of 0.2% to 10% by weight; (C) 1% to 50% by weight of a mineral having a mean particle size of about 2.5 $\mu$m and a maximum particle size of about 20 $\mu$m, said mineral surface-treated with 0.2% to 5% by weight of amino silane; and (D) 1% to 15% by weight of an amorphous fatty acid-treated silica gel comprising 25% to 75% by weight silica and 25% to 75% by weight of a fatty acid amide;
  (b) melting and kneading said blend; and
  (c) cooling and granulating said blend.

15. A process according to claim 14 wherein said blending step (a) includes (E) up to 40% by weight of an ethylene/propylene/polyene terpolymer having a melt index in the range of 1 to 10 g/10 min and a Shore D hardness of 30 to 70.

16. A process of producing a polyolefin alloy having improved surface hardness and scratch resistance, and having a melt index in the range of between 0.1 and 50 g/10 min, comprising the steps of:
  (a) blending (A) 40% to 80% by weight of a polypropylene material selected from the group consisting of a polypropylene homopolymer and a propylene copolymer with ethylene and/or butadiene, said propylene copolymer having a polymerized ethylene and/or butadiene content of 5 mole % to 35 mole %, said polypropylene material having a molecular weight Mw of 100,000 to 300,000 and a melt index of 0.1 to 20 g/min, (B) 1% to 10% by weight of a functionalized polypropylene, said functionalized polypropylene selected from the group consisting of a grafted polypropylene homopolymer and a grafted propylene copolymer with ethylene and/or butadiene, said functionalized polypropylene having a degree of grafting of 0.2% to 10% by weight and (E) 0 to 40% by weight of an ethylene/propylene/polyene terpolymer having a melt index in the range of 1 to 10 g/10 min and a Shore D hardness of 30 to 70;
  (b) melting and kneading said blend;
  (c) blending (C) 1% to 50% by weight of a mineral having a mean particle size of about 2.5 $\mu$m and a maximum particle size of about 20 $\mu$m, said mineral surface-treated with 0.2% to 5% by weight of amino silane and (D) 1% to 15% by weight of an amorphous fatty acid-treated silica gel comprising 25% to 75% by weight silica and 25% to 75% by weight of a fatty acid amide into said blend of step (b); and
  (d) cooling and granulating said blend of step (c).

* * * * *

UNITED STATES PATENT AND TRADEMARK OFFICE
CERTIFICATE OF CORRECTION

PATENT NO.   : 5,973,070
DATED        : October 26, 1999
INVENTOR(S)  : H. Baann Page 1 of 1

It is certified that error appears in the above-identified patent and that said Letters Patent is hereby corrected as shown below:

Column 1,
Line 5, "ia" should read -- is --.
Lines 32 to 70, should be deleted.

Column 2,
Lines 1 to 2, should be deleted.

Column 3,
Line 2, after "SUMMARY OF THE INVENTION" insert deletion.

Signed and Sealed this

Nineteenth Day of March, 2002

Attest:

Attesting Officer

JAMES E. ROGAN
Director of the United States Patent and Trademark Office